US 6,683,705 B1

(12) United States Patent
Yamaguchi (10) Patent No.: US 6,683,705 B1
(45) Date of Patent: Jan. 27, 2004

(54) IMAGE INPUT APPARATUS (75) Inventor: Hiroshi Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/233,053

(22) Filed: Jan. 19, 1999

(30) Foreign Application Priority Data

Jan. 19, 1998 (JP) .......................................... 10-007316

(51) Int. Cl.⁷ ................................................ H04N 1/04
(52) U.S. Cl. ...................................... 358/487; 358/497
(58) Field of Search ................................ 358/487, 486, 358/474, 498, 447

(56) References Cited

U.S. PATENT DOCUMENTS

| | | | |
|---|---|---|---|
| 5,459,477 A | * 10/1995 | Fukuda et al. ................. 345/1 |
| 5,617,223 A | 4/1997 | Burns et al. ................. 358/527 |
| 5,739,922 A | * 4/1998 | Matama ....................... 358/447 |
| 5,889,578 A | * 3/1999 | Jamzadeh ..................... 355/41 |
| 5,920,680 A | * 7/1999 | Inoue et al. ................. 395/101 |
| 6,072,916 A | * 6/2000 | Suzuki ........................ 382/303 |
| 6,262,814 B1 | 7/2001 | Furukawa ..................... 358/487 |
| 6,323,934 B1 | * 11/2001 | Enomoto ...................... 355/40 |
| 2001/0019430 A1 | * 9/2001 | Shiota ........................ 358/487 |

FOREIGN PATENT DOCUMENTS

| | | |
|---|---|---|
| JP | 6-54195 A | 2/1994 |
| JP | 9-62826 A | 3/1997 |
| JP | 9-197549 A | 7/1997 |

* cited by examiner

*Primary Examiner*—Jerome Grant, II
*Assistant Examiner*—Negussie Worku
(74) *Attorney, Agent, or Firm*—Birch, Stewart, Kolasch & Birch, LLP (57) ABSTRACT

There is provided an image input apparatus which comprises a reading condition setting section for determining reading conditions for fine reading in accordance with image data obtained by pre-reading; a fine scan memory for storing the image data obtained by the fine reading performed according to the reading conditions set by the reading condition setting section; a processing condition setting section for setting image processing conditions to obtain output image data in accordance with the image data obtained by the fine reading; and an image processing section for receiving the finely read image data from the fine scan memory and for subjecting the received image data to image processing steps according to the image processing conditions set by the processing condition setting section. Thus, high quality images can be output consistently without any deterioration in image quality which has heretofore occurred in conventional apparatuses due to difference of the reading conditions between prescanned data and fine scanned data.

12 Claims, 4 Drawing Sheets

IMAGE INPUT APPARATUS

BACKGROUND OF THE INVENTION

This invention relates to the technical field of an image input apparatus used in a digital photoprinter or the like which reads an image on a film photoelectrically to obtain a print (photograph) having the image reproduced thereon.

Currently, the image recorded on a photographic film such as a negative film or a reversal film (which is hereinafter referred to as "film") is printed to a light-sensitive material (photographic paper) by "direct exposure" (or analog exposure), in which the image on a film is projected onto the light-sensitive material to perform areal exposure.

A printer that relies upon digital exposure has recently been commercialized. Called a "digital photoprinter", the apparatus operates in the following manner: the image recorded on a film is read photoelectrically; the image is then converted to a digital signal and subjected to various image processing steps to produce image data for recording; a light-sensitive material is exposed by scanning with recording light modulated in accordance with the image data, whereby an image (latent image) is recorded; the necessary processing is done to produce a (finished) print.

In the digital photoprinter, the image recorded on a film is converted to digital image data, which is then processed to determine the conditions for exposure to be performed in printing; hence, the correction of drop-outs or blocked-ups in image such as washed-out highlight or dull shadow due to photography with back light or an electronic flash, sharpening, or the correction of color or density failure can be effectively performed to produce prints of very high quality that have heretofore been unattainable by conventional direct exposure. What is more, by image data processing, a plurality of images can be assembled into one composite image or a single image can be divided into more than one image and even characters can be assembled; thus, prints can be outputted after editing/processing is done in accordance with a specific use.

With the digital photoprinter, the desired image can not only be outputted as a finished print (photo); the image data can also be supplied to a computer or stored in a recording medium such as a floppy disk; thus, the image data can be utilized in various applications other than photography.

Having these capabilities, the digital photoprinter is basically composed of an image input apparatus including a scanner (image reader) for photoelectric reading of the image recorded on a film and an image processor that performs image processing on the thus read image to produce output image data (conditions for exposure), as well as an image output apparatus including a printer (image recorder) that performs scan exposure on a light-sensitive material in accordance with the image data from the image input apparatus and a processor (developing machine) that subjects the exposed light-sensitive material to development and other necessary steps to produce a finished print.

In the scanner, reading light issuing from a light source is allowed to be incident on the film to produce projected light carrying the image recorded on the film and the projected light is focused through an imaging lens on an image sensor such as a CCD sensor, whereby photoelectric conversion is effected to read the image from the film; after optionally being subjected to various image processing steps, image data from the film (image data signal) is sent to the image processor.

The image processor sets the conditions for image processing on the basis of the image data that has been read with the scanner; the image processor then performs image processing on the image data in accordance with the thus set conditions and supplies the printer with output image data (exposure conditions) for image recording.

In the printer, if it is of a type that relies upon exposure by scanning with light beams, the latter are modulated in accordance with the image data sent from the image processor and deflected in a main scanning direction; at the same time, a light-sensitive material is transported in an auxiliary scanning direction perpendicular to the main scanning direction to expose to the light beams carrying the image, thereby forming a latent image. The image is then subjected in the processor to development and other processing steps in accordance with the light-sensitive material, thereby producing a finished print (photograph) reproducing the image recorded on the film.

When the image input apparatus is used to perform photoelectric image reading in the aforementioned digital photoprinter, prescanning (pre-reading) for reading an original at low resolution is usually performed prior to image reading (fine reading=fine scanning) for obtaining output image data. The image data obtained by prescanning is used to set for each frame reading conditions for fine scanned (image) data and (image) processing conditions for processing the image data obtained by fine scanning to produce the output image data. The processing conditions are adjusted as appropriate by the verification that the operator performs as required.

In accordance with the type of the original to be read, reading conditions for prescanned data, specifically the light quantity of reading light (light quantity of a light source), the value to which a variable diaphragm is stopped down, and the storage time of an image sensor such as a CCD sensor are preliminarily determined so that the image sensor is not saturated even at a possible minimum density. Image reading is thus performed under the specified reading conditions in accordance with the type of the original.

On the other hand, reading conditions for fine scanned data are set for (the respective frames of) each image on the original on the basis of the image data obtained by prescanning so that the output from an image sensor such as a CCD sensor saturates at a density a little lower than the minimum density of the image on the original.

In addition, the pixel density for reading is also different between prescanning and fine scanning. The scanning speed is further different when reading is performed by slit scanning.

That is, the reading conditions for prescanned data are different from those for fine scanned data. In order to obtain an image appropriately finished with the fine scanned (image) data, the latter is processed under the image processing conditions that were set based on the prescanned (image) data read under different reading conditions. The processed image data is then converted to output image data. Therefore, there are cases where the output image after processing of the fine scanned data can not be an image supposed to be obtained based on the prescanned data due to difference of the reading conditions between the two kinds of data, which prevents production of images having a specified image quality.

SUMMARY OF THE INVENTION

The present invention has been accomplished under these circumstances and has as an object providing an image input apparatus capable of preventing any reduction in image quality due to the difference of the reading conditions between prescanned data and fine scanned data and ensuring consistent outputting of high quality images.

In order to attain the above object, the present invention provides an image input apparatus in which image data on an original is read photoelectrically and subjected to specified image processing steps to obtain output image data, wherein said apparatus comprises:

reading conditions setting means for determining reading conditions for fine reading in accordance with the image data obtained by pre-reading which is an image reading performed under specified conditions prior to the fine reading for obtaining the output image data;

storage means for storing the image data obtained by the fine reading performed according to the reading conditions set by said reading conditions setting means;

processing conditions setting means for setting image processing conditions to obtain the output image data in accordance with the image data obtained by said fine reading; and image processing means for receiving the finely read image data from said storage means and for subjecting the received image data to the image processing steps according to the image processing conditions set by said processing conditions setting means.

Verification job is preferably performed using said finely read image data.

Preferably, said processing conditions setting means sets at least one of the image processing conditions including color balance adjustment, density adjustment and gradation adjustment which are severally performed for each image region.

Preferably, said processing conditions setting means uses the image data obtained by the fine reading performed for a plurality of frames to set the image processing conditions for each frame, taking into consideration differences of the reading conditions for fine reading between the frames.

Preferably, separate reading means provided in a direction in which said original is transported are used to perform said pre-reading and said fine reading, while transporting said original.

DETAILED DESCRIPTION OF THE INVENTION

The image input apparatus of the present invention is now described in detail with reference to the preferred embodiments shown in accompanying drawings.

Figure 1:
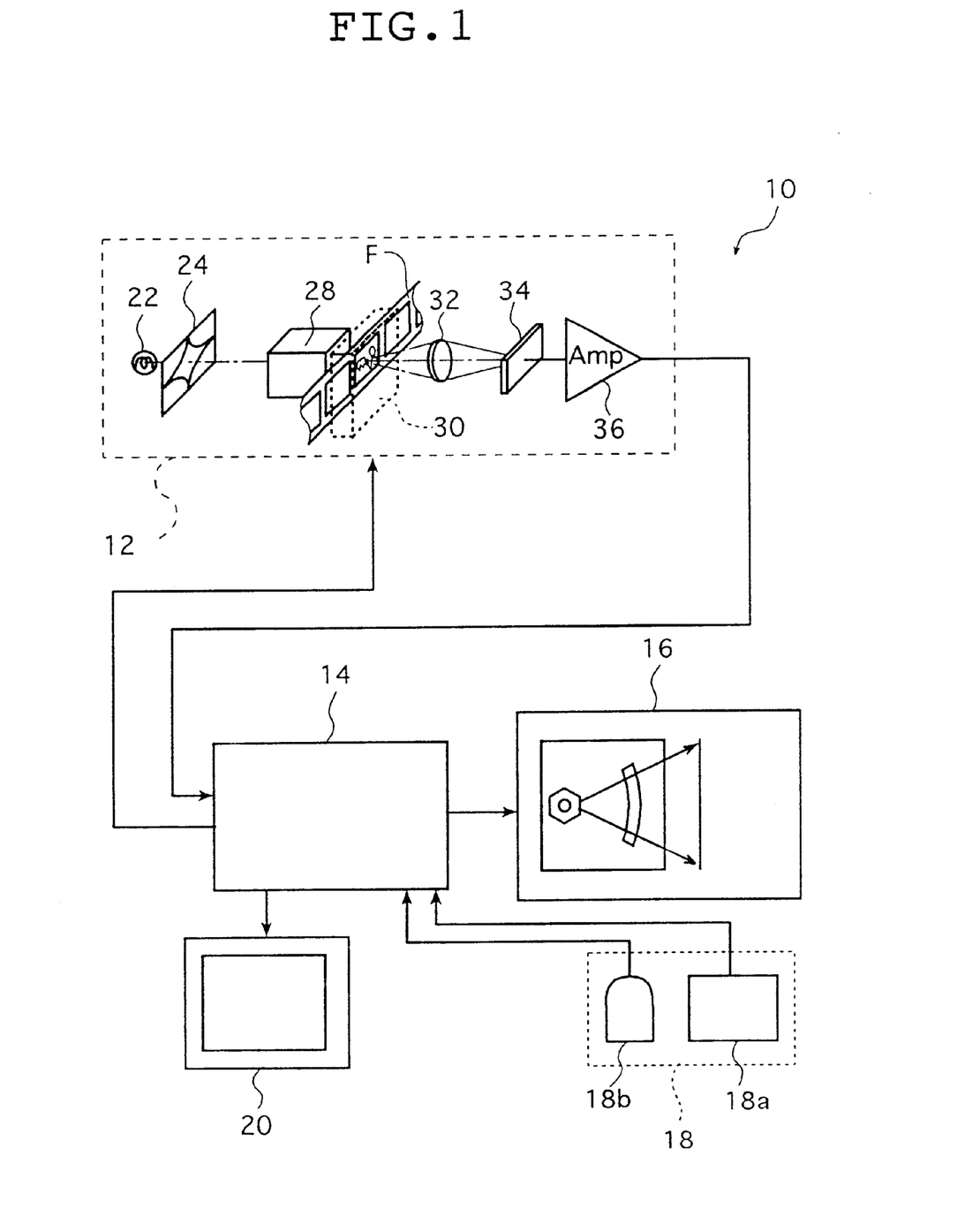
FIG. 1 is a block diagram showing a digital photoprinter using an embodiment of the image input apparatus of the present invention.

FIG. 1 is a block diagram showing an exemplary digital photoprinter using the image input apparatus of the present invention.

The digital photoprinter (hereinafter referred to as "photoprinter") which is generally indicated by 10 in FIG. 1 comprises basically an image input apparatus including a scanner (image reader) 12 for photoelectric reading of the image recorded on a film F, and an image processor 14 which performs image processing on the thus read image data (image information) and with which the photoprinter 10 as a whole is manipulated and controlled, as well as an output apparatus 16 which performs imagewise exposure of a light-sensitive material A with light beams modulated in accordance with the image data delivered from the image processor 14 and which performs development and other necessary processing to produce a (finished) print.

Connected to the image processor 14 are a manipulating unit 18 having a keyboard 18a and a mouse 18b for inputting (setting) various conditions, selecting and commanding a specific processing step and entering a command and so forth for effecting color/density correction, as well as a display 20 for displaying the image read with the scanner 12, various manipulative commands and pictures for setting and registering various conditions on its screen.

The scanner 12 is an apparatus with which the image recorded on the film F is read photoelectrically frame by frame. It comprises a light source 22, a variable diaphragm 24, a diffuser box 28 which diffuses reading light incident on the film F so that it becomes uniform across the plane of the film F, an imaging lens unit 32, an image sensor 34 having line CCD sensors associated with image reading of the respective three primary colors R (red), G (green) and B (blue), and an amplifier (Amp) 36.

In the photoprinter 10, dedicated carriers 30 are available that can be loaded into the body of the scanner 12 in accordance with the type or the size of the film used (e.g. whether it is of an Advanced Photo System or a negative or a reversal of 135 size) or the format of the film (e.g. whether it is a strip or a slide). By replacing one carrier 30 with another, the photoprinter 10 can be adapted to process various kinds of films in various modes. The image (frame) that is recorded on the film and which is subjected to the necessary procedure for print production is transported to and held in a specified reading position by means of the carriers 30.

As is well known, a film of the Advanced Photo System has a magnetic recording medium formed thereon and information such as the ID Number of the film cartridge and the type of the film is recorded. In addition, after taking a picture on the film, development of the film and so forth, various kinds of data such as the date of shooting, position information of the principal portion (principal subject) and the type of the developing machine used can be recorded on the film. A carrier 30 corresponding to the film (or its cartridge) of the Advanced Photo System is fitted with a means of reading said magnetic information from the magnetic recording medium. Said means reads the magnetic information as the film is being transported to the reading position, so that the various kinds of information mentioned above are sent to the image processor 14.

In the scanner 12, the reading light from the light source 22 has its quantity adjusted by means of the variable diaphragm 24 and is incident on the film F held in the specified reading position by means of the carrier 30 and thereafter passes through the film to produce projected light carrying the image recorded on the film F.

Figure 2A:
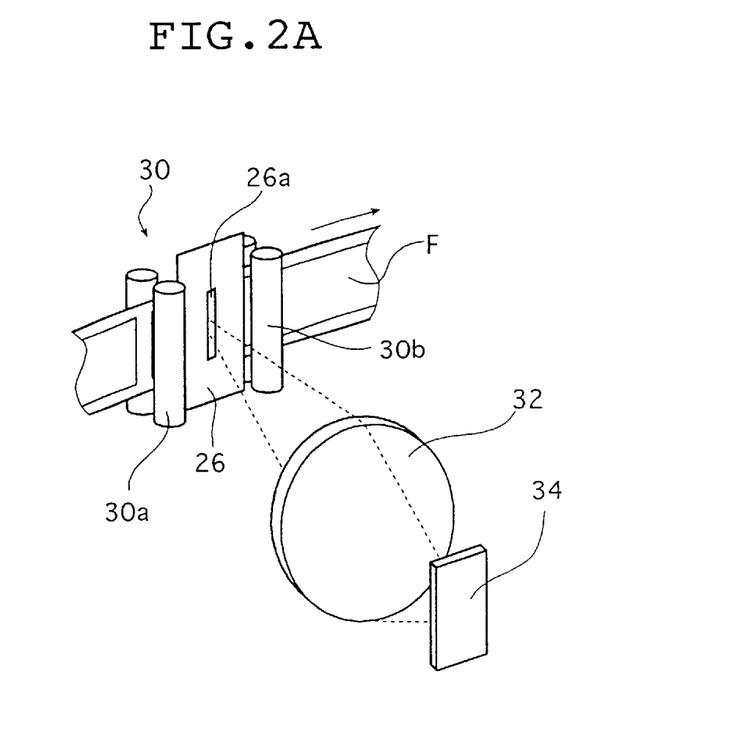
FIG. 2A is a schematic perspective view showing an embodiment of a carrier mounted on the digital photoprinter shown in FIG. 1.

The carrier 30 is intended for the elongated film F (strip) such as a 24-frame film of 135 size and a cartridge of the Advanced Photo System. As shown in FIG. 2A schematically, the carrier 30 comprises transport roller pairs 30a, 30b and a mask 26. The former are provided on the opposite sides of the reading position in an auxiliary scanning direction to transport the film F longitudinally or in the auxiliary scanning direction perpendicular to the direction (main scanning direction) in which the line CCD sensors in the image sensor 34 are arranged, while holding the film F in the specified reading position, and the latter has a slit 26a which extends in the main scanning direction in a position associated with the reading position to restrict the projected light from the film F to a specified slit form.

The reading light is incident on the film F which is transported in the auxiliary scanning direction while being held in the reading position by the carrier 30. Consequently, the slit 26a extending in the main scanning direction slit-scans the film F two-dimensionally to read the image recorded on each frame of the film F (the image on the original).

The projected light from the film F passes through the imaging lens unit 32 to be focused on the light-receiving plane of the image sensor 34.

Figure 2B:
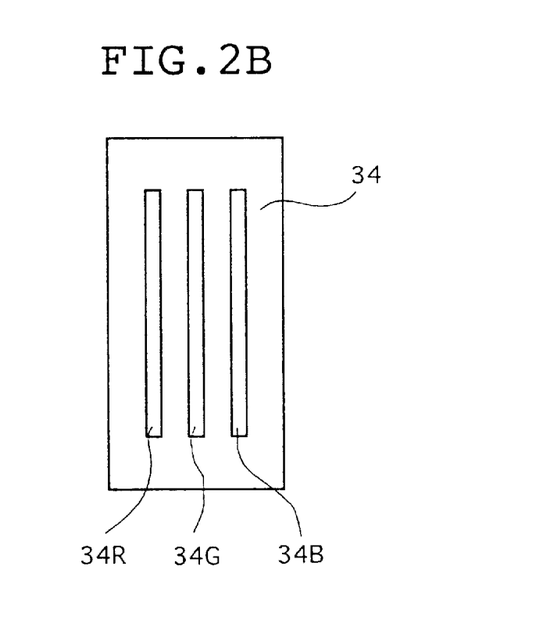
FIG. 2B is a conceptual view showing an embodiment of an image sensor of the digital photoprinter shown in FIG. 1.

As shown in FIG. 2B, the image sensor 34 is the so called three-line color CCD sensor unit having a line CCD sensor 34R for reading of the R image, a line CCD sensor 34G for reading of the G image and a line CCD sensor 34B for reading of the B image. The respective line CCD sensors extend in the main scanning direction as described above. The image sensor 34 reads the projected light from the film F photoelectrically as three separate primary colors R, G and B.

Output signals from the image sensor 34 are amplified by the amplifier 36 and sent to the image processor 14.

In the scanner 12 of the present invention, the image recorded on the film F is read twice by prescanning (pre-reading) for reading the image at low resolution and fine scanning (fine reading) for obtaining the output image data.

Image reading in the image input apparatus of the invention is not limited to the case depending on slit scanning, and areal exposure in which the whole surface of the image of one frame is read at a time may be used.

In this case, a means for inserting color filters R, G and B is provided between the light source and the film F. The respective colors filters R, G and B are successively inserted to separate the image recorded on the film into three primary colors, thereby reading the image by means of an area CCD sensor.

In the illustrated photoprinter 10, the scanner 12 which performs photoelectric reading of the image recorded on a film such as a negative or a reversal is used as a source of supplying image data into the image processor 14. It should, however, be noted that the scanner 12 is not the only applicable source of supplying image data into the image processor 14 and various image reading means, imaging means and means of storing image data can be substituted, as exemplified by an image reading apparatus for reading the image on a reflection original, an imaging device such as a digital camera or a digital video camera, communication means such as a LAN (local area network) or an on-line service network, and a recording medium such as a memory card or MO (magneto-optical recording medium).

As already mentioned, the output signal (image data) from the scanner 12 is delivered to the image processor 14.

Figure 3:
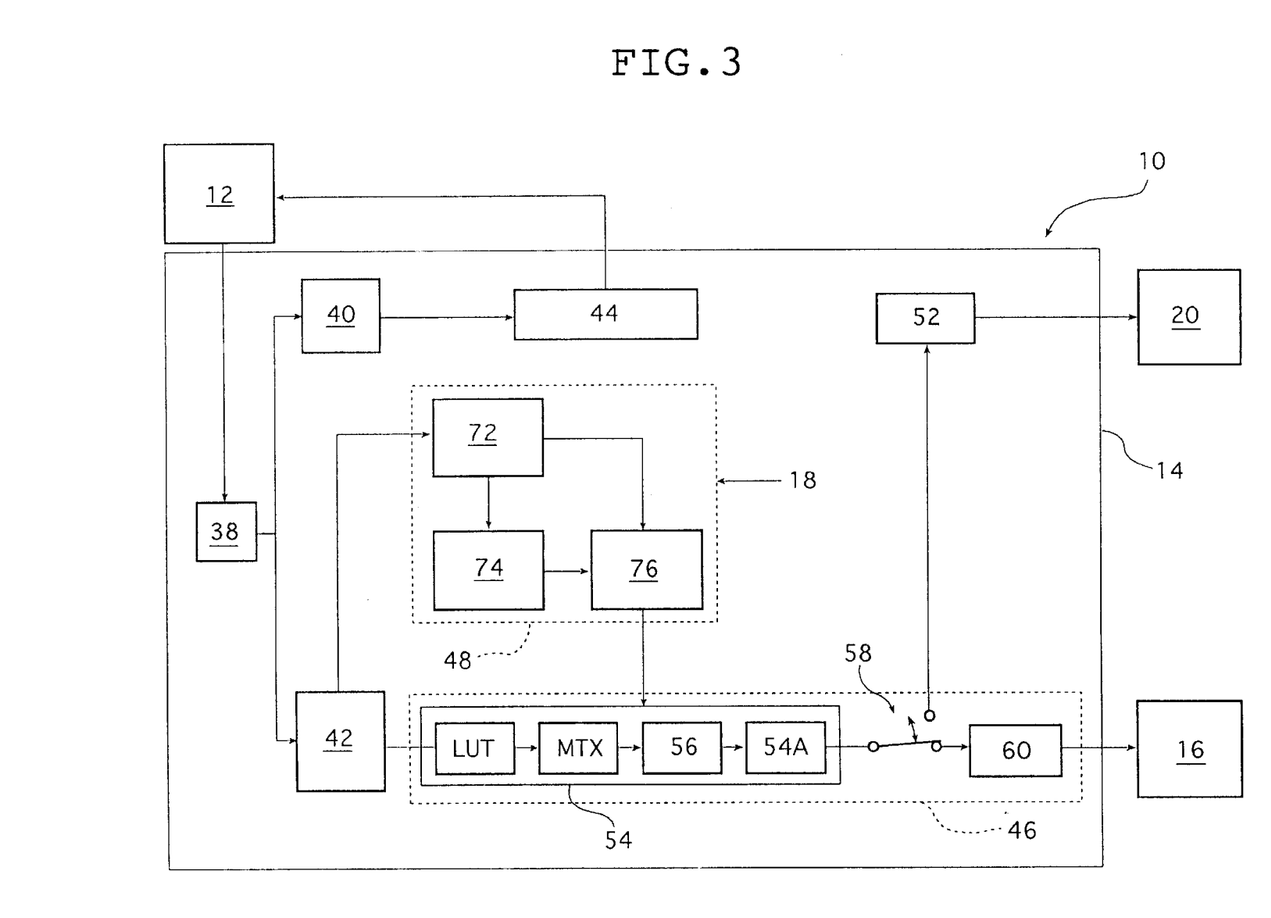
FIG. 3 is a block diagram showing an embodiment of an image processor of the digital photoprinter shown in FIG. 1.

FIG. 3 is a block diagram showing the image processor 14. The image processor 14 comprises a data processing section 38, a prescan (frame) memory 40, a fine scan (frame) memory 42, a reading condition setting section 44, a fine scanned image processing section 46, a processing condition setting section 48 and an image data converting subsection 52.

FIG. 3 shows only the parts related to image processing and the image processor 14 actually includes other necessary parts such as a CPU with which the photoprinter 10 as a whole including the image processor 14 is controlled and managed, and a memory for storing the information necessary for operation and otherwise of the photoprinter 10. The manipulating unit 18 and the display 20 are connected to related parts via the CPU and other necessary parts (forming a CPU bus).

Each of the output signals R, G and B from the scanner 12 is fed into the data processing section 38, where it is subjected to A/D (analog/digital) conversion, logarithmic conversion, DC offset correction, dark correction, shading correction and other processing steps so that each output signal is converted to digital image data, of which prescanned (image) data is stored in the prescan memory 40 and fine scanned (image) data is stored in the fine scan memory 42.

It should be noted that the output signals of the prescanned data and the fine scanned data are basically the same except for (pixel density) and signal level, as described below.

The prescanned data stored in the prescan memory 40 is subsequently read in the reading condition setting section 44.

The reading condition setting section 44 calculates the minimum density (highlight) of the image on the original based on the prescanned data and set the reading conditions for fine scanned (image) data, specifically the light quantity of the light source 22, the value (aperture size) to which the variable diaphragm 24 is stopped down, the storage time of the respective line CCD sensors in the image sensor 34.

The method of setting the reading conditions for fine scanned data is not limited in any particular way. Thus, it is only necessary to set the above-described reading conditions so that the line CCD sensors are saturated at a density a little lower than the minimum density of the image on the original. The storage time may be adjusted as required with the respective line CCD sensors R, G and B to adjust color balance of the image on the original in fine scan mode.

It should be however noted that, in accordance with the type of the original to be read, prescanning is performed under the predetermined reading conditions for prescanned data so that the output from the image sensor 34 is not saturated even at a possible minimum density. The reading conditions for fine scanned data are not however limited to the case where the light quantity, the value to which the variable diaphragm 24 is stopped down and the storage time in the reading conditions for prescanned data are all adjusted. Thus, the storage time of the image sensor 34 may be only changed, with the other conditions being identical to those for prescanned data; or the storage time and the value of the variable diaphragm 24 may be changed, with the light quantity of the light source being the same. Alternatively, the adjustment requirements of the reading conditions may be selected as appropriate in accordance with the state of the image on the original.

In the image input apparatus of the present invention, all the frames of the film F may be subjected to fine scanning after prescanning and setting of the reading conditions for fine scanned data are performed. Alternatively, prescanning and fine scanning may be performed alternately frame by frame or every few frames.

The scanning method can be determined as appropriate in accordance with the storage capacities or the like of the prescan memory 40 and the reading condition setting section 44. When reading the film F by slit scanning as shown in FIG. 2A however, forward/return transport of the film is essential. Then, if the storage capacity is sufficient, all the frames of a film are preferably subjected to prescanning prior to fine scanning, taking into consideration the load on the carrier 30 or other factors.

Figure 4:
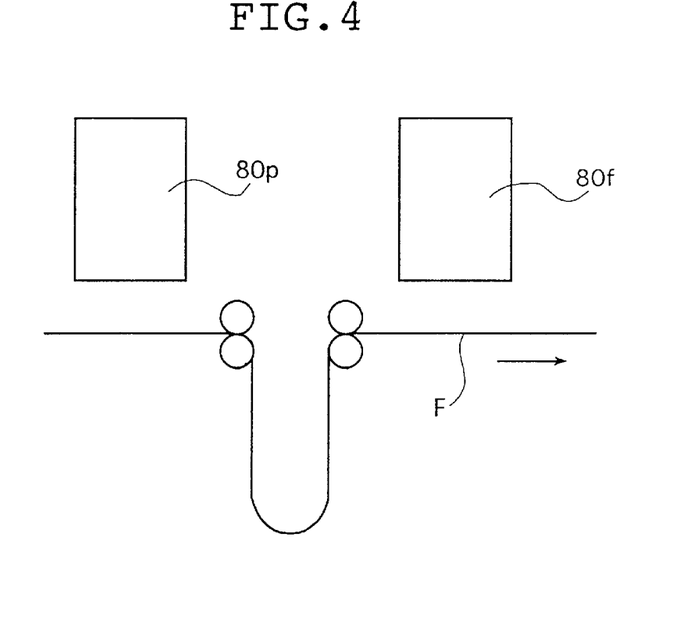
FIG. 4 is a schematic view showing an example of image reading in the image input apparatus of the invention.
Figure 5:
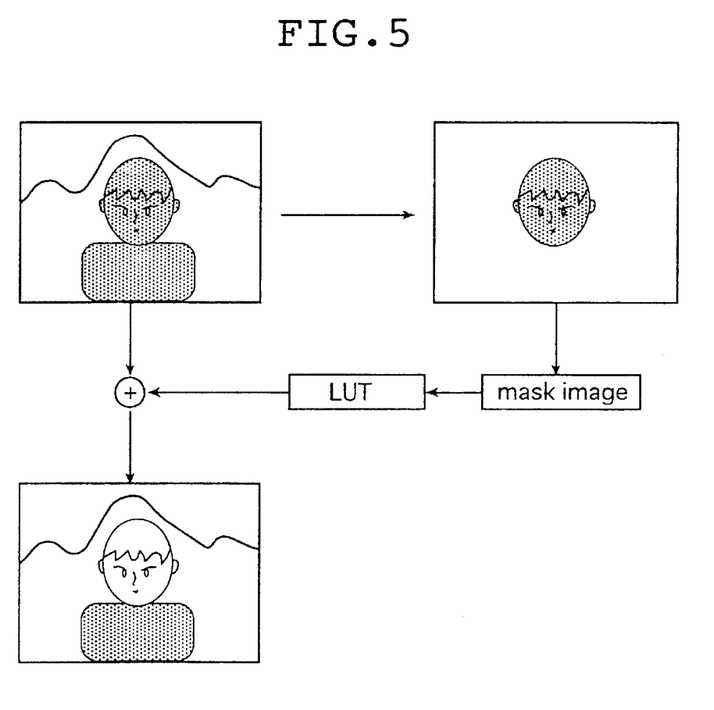
FIG. 5 is a schematic view showing an example of image processing in the image input apparatus of the invention.

In the illustrated case, prescanning and fine scanning are performed using the same reading system. The invention is not however limited thereto and a reading system for prescanning 80p and a reading system for fine scanning 80f may be separately provided in the transport direction of the film F (shown by an arrow in FIG. 4), as shown in FIG. 4 schematically.

The embodiment shown in FIG. 1 where fine scanning and prescanning are performed by means of one image sensor 34 requires much time for reading because of the necessity of the forward/return transport of the film F. In contrast, the embodiment shown in FIG. 4 which comprises a plurality of reading systems is capable of prescanning and fine scanning by one-direction (one-pass) transport of the film F. Then, the latter is preferred in that more rapid image reading can be performed.

The resolution is different between prescanning and fine scanning, as mentioned above. Then, a high resolution image sensor is used for fine scanning. The transport speed of the film F is also usually different between the two scanning modes. Therefore, a loop forming section of the film F is preferably provided between the reading systems 80p and 80f in the embodiment shown in FIG. 4.

The fine scanned image processing section 46 comprises an image processing subsection 54, switching means 58 and an image data converting subsection 60. The image processing subsection 54 (which is hereinafter referred to as "processing subsection 54") is the site where the fine scanned image (image data) read with the scanner 12 is subjected to specified image processing steps in accordance with the image processing conditions set in the processing condition setting section 48 to be described below.

The image processing steps to be performed in the processing subsection 54 may be exemplified by color balance adjustment, gradation adjustment, density adjustment, dodging (compression/expansion of the density's dynamic range), saturation correction, sharpening and electronic scaling. These steps may be performed by any known methods comprising suitable combinations of processing with a LUT (lookup table), filtering, matrix (MTX) operations, arithmetic operations for interpolation and so forth; in the illustrated case, color balance adjustment, gradation adjustment and density adjustment are performed with LUTs and saturation correction with MTX. Electric magnification is performed in a block 56, and sharpening, dodging and other steps in a block 54A.

The switching means 58 is used to change over the output destination of the image data processed in the processing subsection 54 between the image data converting subsections 52 and 60.

The image data converting subsection 52 is the site where, after removing as required a portion thereof, the image data processed by the processing subsection 54 is converted with a 3D (three-dimensional) LUT or the like into image data corresponding to the representation on the display 20. The image data converting subsection 60 of the fine scanned image processing section 46 is the site where the image data processed by the processing subsection 54 is similarly converted with a 3D LUT or the like into image data that is subsequently supplied into the output apparatus 16 as image data corresponding to image recording with the output apparatus 16.

The conditions for various processing steps that are to be performed in the fine scanned image processing section 46 are set by the processing condition setting section 48. The processing conditions setting section 48 comprises an image processing condition setting subsection 72, a key correcting subsection 74 and a parameter coordinating subsection 76.

The image processing conditions setting subsection 72 (hereinafter referred to as "setting subsection 72") selects a particular image processing step to be performed; it uses the fine scanned data to set the conditions for image processing to be done in the processing subsection 54 and supply them to the parameter coordinating subsection 76.

Specifically, the setting subsection 72 read the stored fine scanned data (optionally after thinning it) to perform various operations including the construction of density histograms, calculation of various image characteristic quantities such as average density, LATD (large-area transmission density), highlight (minimum density) and shadow (maximum density), and extraction of a principal subject or a specified object to be processed. In addition, in response to commands optionally entered by the operator using the manipulative unit 18, the setting subsection 72 determines the image processing conditions as by constructing tables (LUT) for the aforementioned gray balance adjustment or the like, as well as the construction of operational matrices for saturation correction.

According to the present invention, only the reading conditions for fine scanned data are set based on the prescanned data and the image processing conditions to obtain the output image data are set using the fine scanned data, which ensures setting of the image processing conditions suitably corresponding to the fine scanned data. Hence, high quality images can be output in a consistent manner without any deterioration in image quality due to the difference of the reading conditions between prescanned data and fine scanned data or due to shifting of the image position between prescanning and fine scanning which may be caused by red-eye correction or image adjustment severally performed for each region through the extraction of the principal subject.

The key correcting subsection 74 calculates the amounts of adjustment of image processing conditions (e.g. the amount of correction of LUT) typically in accordance with various commands entered by manipulation of keys for adjusting the density (brightness), color, contrast, sharpness, saturation and so forth that have been set in the keyboard 18a or by the mouse 18b; the key correcting subsection 74 then supplies the calculated amounts of adjustment into the parameter coordinating subsection 76.

After receiving the image processing conditions set by the setting subsection 72, the parameter coordinating subsection 76 sets the supplied image processing conditions in the processing subsection 54 of the fine scanned image processing section 46. Further, in accordance with the amounts of adjustment calculated by the key correcting subsection 74, the parameter coordinating subsection 76 either corrects (adjusts) the image processing conditions set in various sites or makes another setting of image processing conditions.

We now describe the image input apparatus of the present invention in detail through the description of the operation of the processor 14.

The operator mounts the carrier 30 corresponding to the film F (or the frame to be read) on the scanner 12, set the film F in a specified position of the carrier 30 and performs specified operations such as entering the size of the print to be produced, before a command for print start is issued. Thus, the value to which the variable diaphragm 24 is stopped down in the scanner 12, and the storage time of the image sensor (or line CCD sensors) 34 are set based on the reading conditions for prescanned data. Thereafter, the carrier 30 transports the film F in the auxiliary scanning direction at a speed adapted for prescanning to start prescanning operation. As mentioned above, the film F is slit-scanned, and the projected light from the film F is focused on the image sensor 34, whereupon the image recorded on the film F is read photoelectrically as separate colors R, G and B. The thus read image data is output to the prescan memory 40.

As mentioned above, the number of frames to be prescanned is not particularly limited, but in this embodiment, the film F is continuously transported from the forward end to the rear end, and all the frames having the image recorded thereon are first subjected to prescanning.

When the prescanned data is stored in the prescan memory 40, the reading condition setting section 44 read the stored data and perform necessary arithmetic operations to set and store the reading conditions for fine scanned data frame by frame. In addition, the frame position is also extracted as required.

When the image reading conditions are set for all the frames after the end of prescanning, fine scanning starts. It should however be noted that, in fine scan mode, the film F may be transported by means of the carrier 30 in the direction reverse to the transport direction in prescan mode, or in the same direction as in prescan mode after the film F is returned to original position. Alternatively, fine scanning may be performed frame by frame while transporting the film F discontinuously, or a plurality or all of the frames may be subjected to fine scanning while transporting the film F continuously depending on the capacity of the fine scan memory 42. In the illustrated case, fine scanning is performed frame by frame while the film F being transported in the direction reverse to the transport direction in prescan mode.

When fine scanning starts to transport the film F by means of the carrier 30 at a fine scan speed, the reading conditions for fine scanned data of the first frame (or the last frame in prescan mode) are sent from the reading condition setting section 44 to the scanner 12, where for example the variable diaphragm 24 and the image sensor 34 are adjusted in accordance with the supplied reading conditions. Furthermore, when the first frame is transported to the reading position, the image sensor 34 reads the image thereof in the same manner as previous prescanning.

When the fine scanned image data is stored in the fine scan memory 42, the setting subsection 72 reads the stored image data to perform various operations including the construction of density histograms and calculation of various image characteristic quantities. The obtained histograms and characteristic quantities are used to set the image processing conditions, which are sent to the parameter coordinating subsection 76.

The image processing conditions received by the parameter coordinating subsection 76 are set in a specified site (hardware) in the processing subsection 54 of the fine scanned image processing section 46.

Then, when the switching means 58 connects the processing subsection 54 to the image data converting subsection 52, the fine scan memory 42 outputs the fine scanned data, which are processed under the image processing conditions set in the processing subsection 54 and converted in the image data converting subsection 52. The converted data is represented on the display 20 as a simulation image.

When a plurality of frames are continuously subjected to fine scanning, the data of these frames may be represented on the display 20 as the simulation image. Alternatively, the apparatus may be capable of changing the frames or number of frames to be represented for desired simulation image.

Looking at the representation on the display 20, the operator checks (verifies) the image, or the result of the processing, and if necessary, manipulates the aforementioned keys on the keyboard 18a or the mouse 18b to adjust the color/density, gradation and other features of the image.

The inputs for this adjustment are sent to the key correcting subsection 74 which, in response to the entered inputs for adjustment, calculates the amounts of correction of the image processing conditions and sends them to the parameter coordinating subsection 76. In response to the supplied amounts of correction, the parameter coordinating subsection 76 corrects the LUTs and MTXs in the processing subsection 54, as already described above. Thus, the image represented on the display 20 also varies in response to this corrective measure, or the inputs for adjustment entered by the operator.

If the operator concludes that the image represented on the display 20 is appropriate (verification OK), he manipulates the keyboard 18a or the mouse 18b to give a command for print start, whereupon the image processing conditions are finalized and the switching means 58 connects the processing subsection 54 to the image data converting subsection 60. The fine scanned data output from the fine scan memory 42 and processed in the processing subsection 54 is sent to the image data converting subsection 60, where the input data is converted to the image data adapted for image recording with the output apparatus 16 to which the converted data is sent.

If no image verification is to be performed, the image processing conditions are finalized at the point of time when the parameter coordinating subsection 76 ends setting of the image processing conditions in the processing subsection 54 of the fine scanned image processing section 46, and the fine scanned data output from the fine scan memory 42 is processed and sent to the output apparatus 16. The above described alternative procedures are preferably selected in terms of operating modes or the like. If no image verification is to be performed, the simulation image may not be represented on the display 20.

When the fine scanned data of the first frame is sent to the processing subsection 54 upon finalization of the image processing conditions, the reading conditions for fine scanned data of the second frame is sent from the reading condition setting section 44 to the scanner 12, which starts fine scanning of the second frame in accordance with the received reading conditions. When the second frame is transported to the reading position, the image is read. The resulting fine scanned data is used to set the image processing conditions and to verify the simulation image represented on the display 20. When the image processing conditions are finalized, the fine scanned data is subjected to image processing and sent to the output apparatus 16. The third, fourth and subsequent frames are successively subjected to fine scanning and the processed image data are output to the output apparatus 16 in the same manner.

In the digital image processing as described above, image processing for specified image region such as red-eye correction or image processing of which the conditions are different between the face portion and the background can be also performed advantageously.

The image processing for specified image region depends on the image region (image position) and requires a high degree of positional precision between the image for use in setting of the image processing conditions and the output image to be actually processed.

However, in a conventional apparatus which uses the prescanned data to set the image processing conditions for fine scanned data, various factors including a transport error of the film F and an extraction error of the image region cause shifting of the image position between prescanning and fine scanning, which often prevents setting of the appropriate image processing conditions and thus deteriorates the image quality.

According to the invention which uses the fine scanned data to set the image processing conditions, shifting of the image position as described above does not occur, and high quality images can be output in a consistent manner even when image processing for specified region is performed.

The image processing for specified image region is not limited in any particular way, and include, among others, at least one of color balance adjustment, density adjustment and gradation adjustment which are severally performed for each region. In a back-lighted scene, a high contrast scene or a scene having a high contrast between the background and the principal subject such as the face of a person, the principal subject is extracted, after which the principal subject and the background are processed under the different image processing conditions to be appropriately finished.

Specifically, the fine scanned data is used for setting the image processing conditions and is also analyzed to extract the principal subject (face of a person in the illustrated case) from the original image. Any known method such as a method for detecting the continuity of the image (color/density) or a method for detecting the edge of the image and the shape thereof can be used to extract the principal subject. The fine scanned data may be used as such or after thinning it to extract the principal subject.

Then, a mask image (data) of the extracted principal subject is created. Vignetting is preferably performed on the periphery of the mask image in order to finish the boundary between the background and the principal subject in a natural manner.

Further, the created mask image is processed using for example a LUT to produce an image, which is added to the original image and processed so that the color, density and gradation of the principal subject can be finished appropriately on the original image. Alternatively, the mask image may be processed to produce an image suitable for outputting and substituted for the principal subject on the original image.

The creation of the mask image and image processing can be performed for example in the setting subsection 72. The addition of the mask image to the original image (for synthesis) can be performed for example in the processing subsection 54.

Another preferred example is red-eye correction. The fine scanned data is used for setting the image processing conditions and is also analyzed as in the above case to extract the eyes of a person. The occurrence of a red-eye phenomenon is also verified. The operator may be verified whether the red-eye phenomenon occurs or not.

In the case where the red-eye phenomenon occurs, the conditions for correcting the eyes on the original image are set so as to finish the eyes appropriately, and the eyes are processed.

As is clear from the above, the present invention prevents deterioration of the image quality due to the shifting of the image position in a specified region as seen in a conventional apparatus in which the image processing conditions are set using the prescanned data, because the image used for extracting the specified region and setting the processing conditions is the same as the output image to be processed, even in the case where image processing for specified image region such as red-eye correction or image processing severally performed for the principal subject and the background is performed.

Even in a high-contrast scene or a back-lighted scene of high contrast, both the principal subject and the background can be finished appropriately, and the red-eye phenomenon can be also suitably corrected.

According to the invention, the image processing conditions are not limited to the case where the fine scanned data of the frame of interest is only used for setting, and the image processing conditions may be set using the fine scanned data of a plurality of frames, preferably all of the frames in the film. Thus, unbalanced color due to the type of a light source used for shooting or the development property of the film F can be suitably corrected.

In the present invention which uses the fine scanned data to set the image processing conditions, the reading conditions are different frame by frame. For example, the reading conditions for fine scanned data vary more from those for prescanned data in the over-exposed image than in the under-exposed image. Therefore, the fine scanned data of each frame can not be treated in the same manner, which often prevents setting of the appropriate image processing conditions.

To solve this problem, the variation of the reading conditions is preferably taken into consideration in the present invention, when setting the image processing conditions of each frame using the fine scanned data of the plurality of frames. Thus, the expression:

Corrected fine scanned data=Fine scanned data+$\Delta D$ is calculated; the obtained corrected fine scanned data is used to set the image processing conditions.

It should be however noted that the method for calculating "$\Delta D$" is not limited in any particular way, and may be set taking into consideration the variation in the reading conditions for fine scanned data. Alternatively, the average density "D1" of the prescanned data and the average density "D2" of the fine scanned data are calculated and the difference therebetween may be used as "$\Delta D$", as shown in the following expression:

$\Delta D = D1 - D2$

"D1" and "D2" can be calculated by means of a histogram.

As mentioned above, the image data processed in the processor 14 is sent to the output apparatus 16.

The output apparatus 16 comprises a printer (exposing apparatus) which exposes a light-sensitive material (photographic paper) in accordance with the supplied image data to record a latent image thereon, and a processor (developing machine) which subjects the exposed light-sensitive material to specified processing steps to produce a (finished) print. To give one example, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data from the processor 14; the three modulated light beams are deflected in the main scanning direction and, at the same time, the light-sensitive material is transported in the auxiliary scanning direction perpendicular to the main scanning direction to expose the light-sensitive material by two-dimensional scanning with the light beams; the light-sensitive material having the latent image recorded thereon is supplied to the processor and subjected to a wet development process comprising color development, bleach-fixing and rinsing; the thus processed light-sensitive material is dried to produce a print; the thus produced prints are sorted in a stack tray in a specified unit, for example every film roll.

While the image input apparatus of the present invention has been described above in detail, it should be noted that the invention is by no means limited to the examples described above and various improvements and modifications can of course be made without departing from the scope and spirit of the invention.

As described above in detail, the digital image input apparatus of the present invention used in a digital photoprinter is capable of setting image processing conditions suitably corresponding to the fine scanned image data to be output and outputting the fine scanned image data after processing. Therefore, high quality images can be output consistently without any deterioration in image quality which has heretofore occurred in conventional apparatuses due to difference of the reading conditions between prescanned data and fine scanned data or due to shifting of the image position between prescanning and fine scanning which may be caused by processing severally performed for each region.

What is claimed is:

1. An image input apparatus which reads an image on an original photoelectrically to obtain first image data and subjects the first image data to specified image processing steps to obtain output image data, wherein said apparatus comprises:
   reading conditions setting means for determining at least one reading condition for fine reading in accordance with second image data obtained only by pre-reading, said pre-reading being an image reading of said image on said original performed under specified conditions prior to the fine reading of said image on said original for obtaining the first image data;
   storage means for storing the first image data obtained by the fine reading performed according to the reading conditions set by said reading conditions setting means;
   processing conditions setting means for setting image processing conditions to obtain the output image data in accordance with the first image data obtained by said fine reading; and
   image processing means for receiving the finely read first image data from said storage means and for subjecting the received first image data to the image processing steps according to the image processing conditions set by said processing conditions setting means to obtain the output image data,
   wherein said processing conditions setting means uses the first image data obtained by the fine reading performed for a plurality of frames to set the image processing conditions for each frame, taking into consideration differences of the reading conditions for fine reading between the frames.

2. The image input apparatus according to claim 1, wherein a verification job is performed using said finely first read image data.

3. The image input apparatus according to claim 1, wherein said processing conditions setting means sets said at least one processing condition of image processing conditions including color balance adjustment, density adjustment and gradation adjustment which are severally performed for each image region.

4. The image input apparatus according to claim 1, wherein separate reading means provided in a direction in which said original is transported are used to perform said pre-reading and said fine reading, while transporting said original.

5. An image input apparatus which reads an image on an original photoelectrically to obtain the first image data and processes the first image data to obtain output image data, the apparatus comprising:
   a display
   a memory; and
   a processor coupled to the memory and the display, the processor configured to determine one or more reading conditions for fine reading based only on second image data obtained by pre-reading prior to the fine reading; wherein said processor
   performs the fine reading of the image based on the determined one or more reading conditions to generate first image data;
   stores the first image data in the memory;
   sets one or more image processing conditions based on the first image data; and
   processes the first image data retrieved from the memory according to one or more image processing steps based on the set one or more image processing conditions to obtain the output image data,
   wherein the processor, in setting the one or more image processing conditions, is further configured to set the one or more image processing conditions based on the first image data obtained by performing the fine reading for the image of each of a plurality of frames and considering one or more differences in the one or more reading conditions between the each.

6. The image input apparatus according to claim 5, wherein the processor is further configured to:
   display the output image on the display; and
   verify the output image data based on the display to determine whether one or more adjustments to the one or more image processing conditions are required.

7. The image input apparatus according to claim 5, wherein the one or more image processing conditions includes at least one of: a color balance adjustment, a density adjustment and a gradation adjustment, the at least one performed for each image region.

8. The image input apparatus according to claim 5, further comprising a reader and wherein the processor is further configured to cause the reader to read in a direction in which the original is transported and wherein the processor, in performing the fine reading is further configured to cause the reader to finely read while transporting the original.

9. A method for inputting an image in which first image data is obtained by reading the image on an original photoelectrically and image processed to obtain output image data, the method comprising:
   determining one or more reading conditions for fine reading based only on second image data obtained by pre-reading prior to the fine reading;
   performing the fine reading of the image based on the determined one or more reading conditions to generate the first image data;

storing the first image data in a memory;

setting one or more image processing conditions based on the first image data; and processing the first image data retrieved from the memory according to one or more image processing steps based on the set one or more image processing conditions to obtain the output image data, wherein the step of setting the one or more image processing conditions further includes the steps of:

setting the one or more image processing conditions based on the first image data obtained by performing the fine reading for the image of each of a plurality of frames; and considering one or more differences in the one or more reading conditions between the each.

10. The image input method according to claim 9, further comprising:

displaying the output image on a display; and verifying the output image data based on the display to determine whether one or more adjustments to the one or more image processing conditions are required.

11. The image input method according to claim 9, wherein the one or more image processing conditions includes at least one of: a color balance adjustment, a density adjustment and a gradation adjustment, the at least one performed for each image region.

12. The image input method according to claim 9, further comprising the steps of causing a reader to read in a direction in which the original is transported, and wherein the step of performing the fine reading further includes causing the reader to finely read while transporting the original.

* * * * *